United States Patent [19]

Armanini et al.

[11] 4,047,969
[45] Sept. 13, 1977

[54] IRON BLUE NACREOUS COATED PIGMENTS

[75] Inventors: Louis Armanini, Pleasantville; Cordell E. Johnson, Peekskill, both of N.Y.

[73] Assignee: The Mearl Corporation, Ossining, N.Y.

[21] Appl. No.: 729,787

[22] Filed: Oct. 5, 1976

[51] Int. Cl.² ............................................. C09C 1/00
[52] U.S. Cl. ................................... 106/291; 106/304; 106/308 B; 423/367; 106/299; 106/300
[58] Field of Search ............... 106/291, 304, 308 B

[56] References Cited

U.S. PATENT DOCUMENTS

| | | | |
|---|---|---|---|
| 3,874,890 | 4/1975 | Bernhard et al. | 106/291 |
| 3,915,733 | 10/1975 | Reinhardt et al. | 106/304 |
| 3,951,679 | 4/1976 | Bernhard et al. | 106/291 |
| 3,985,571 | 10/1976 | Reinhardt et al. | 106/304 |

*Primary Examiner*—Patrick P. Garvin
*Assistant Examiner*—J. V. Howard
*Attorney, Agent, or Firm*—Ostrolenk, Faber, Gerb & Soffen

[57] ABSTRACT

By addition of ferric ions to a ferrocyanide solution and adjustment of the pH, Iron Blue is directly precipitated and adheres to a mica or metal oxide coated mica substrate.

10 Claims, No Drawings

IRON BLUE NACREOUS COATED PIGMENTS

BACKGROUND OF THE INVENTION

Nacreous pigments and their optical effects are well known. As a result of the interference phenomenon in which certain wave-lengths are reinforced and others are cancelled, colors ranging from pearl to green can be produced by controlling the thickness of the coating on various substrates. These colors are obtained by reflection and, when the pigment is viewed by transmission, the complementary color is obtained.

The interference colors are not strong and, in many instances, it is necessary to add absorption pigments in order to enhance the play of colors. The absorption pigment alters both the reflection color which is viewed and the transmission color. If too great a concentration of absorption pigments is used, the pearly or nacreous quality of the product is lost. The absorption pigments, although very finely divided, scatter light, and a diminution of the nacreous luster results. Therefore, the amount of absorption pigment which can be added in many instances is limited by the decrease in luster which can be tolerated.

There are several methods which are used to add absorption pigments to nacreous pigments. If the absorption pigment is very finely divided, a simple blending can suffice. However, very finely divided pigments which are acceptable for cosmetic applications, a primary use of nacreous pigments, are not available. If the absorption pigment particles are very large and used as such, they scatter light and detract from the luster effect.

Another problem which is encountered when blending a finely divided absorption pigment with a nacreous pigment is that a separation can take place in certain formulations with the finely divided pigment migrating and resulting in a non-homogenous product. For example, blending a finely divided Iron Blue with a blue reflecting titanium dioxide coated nacreous pigment results in a pigment in which both the reflection color and absorption color are blue. This pigment, however, suffers from the fact that the finely divided Iron Blue is not held on the surfaces of the nacreous pigment and migration with its resulting discoloration can occur when dispersed in different vehicles.

It is obviously advantageous if the absorption pigment can be made highly adherent to the surfaces of the nacreous pigment and, in this way, prevent migration of color under use conditions. For example, precipitating a layer of chromium oxide hydroxide onto the surfaces of a green reflecting titanium dioxide coated mica nacreous pigment followed by calcination results in the green absorbing pigment being held on the surface of the substrate and preventing migration. Such a method, however, results in a color of low purity, and very high concentrations of chromium oxide are needed in order to produce intense green colors.

In many applications, especially in the field of cosmetics, a precise color is needed if the desired effect is to be produced. In many cases, various shades of green are desired, ranging from the blue-green to the yellow-green. Precipitation of hydrous chromic oxide does not permit shading, which is extremely important in cosmetics.

Iron Blue, which is also known as Prussion Blue, and Berlin Blue, is acceptable for use in cosmetic preparations. By mixing the absorbing Iron Blue pigment with an appropriately colored nacreous pigment, a green product can be obtained. It has been pointed out above that merely blending Iron Blue with the nacreous pigment results in a product in which the Iron Blue is not held on the surfaces of the pigment and migration with its resulting discoloration occurs. In U.S. Pat. No. 3,951,679, it is pointed out that the conventional precipitation of absorption pigments onto nacreous pigments is unsuitable for a precipitation of Iron Blue because the latter forms colloidal deposits during direct precipitation, which adhere only partially or not at all on the flakes of the nacreous pigment. This leads to non-reproducible batches, to considerable difficulties during filtering, and most particularly, a lack of nacreous effect.

In order to cause Iron Blue to adhere to the surfaces of the nacreous pigment, U.S. Pat. No. 3,951,679 employs the device of coating an Iron Blue precursor on the nacreous pigment and then converting the precursor to the Iron Blue. This is accomplished by coating the starting mica flakes with ferrous hexacyanoferrate (II), either by direct precipitation or by first precipitating a ferrous salt and then reacting the salt with a hexacyanoferrate (II), followed by oxidation to Iron Blue. Alternatively, the mica flakes are coated with a ferric salt, either directly or by first coating with a ferrous salt which is oxidized to the ferric salt, followed by reacting the precipitated ferric salt with hexacyanoferrate (II) to form the Iron Blue. The direct precipitation of a ferric salt is not preferred because it is difficult to coat the starting pigment as a result of the tendency of precipitates of trivalent iron compounds to assume the colloidal form. A third alternative described is the coating of the mica flakes with a ferrous salt followed by reaction with a hexacyanoferrate (III). Whichever method is employed, it is indicated that the precipitation conditions are adjusted conventionally so that the precipitate is immediately and quantitatively deposited on the mica flakes and, in that connection, it is important that an excess of metallic ions be avoided.

As is apparent from the foregoing description, a method of directly precipitating Iron Blue onto the surfaces of a nacreous pigment has not heretofore been described, and it is accordingly the object of this invention to provide such a method. This and other objects of the invention will become apparent to those of skill in this art from the following detailed description.

SUMMARY OF THE INVENTION

This invention relates to Iron Blue coated nacreous pigments and more particularly to a method of directly coating nacreous pigments with an Iron Blue layer which is adherent.

DESCRIPTION OF THE PREFERRED EMBODIMENTS

The objects of this invention are achieved by directly precipitating Iron Blue onto mica or a nacreous pigment which is dispersed in a solution containing a soluble ferrocyanide and excess ferric ions and the pH of which has been adjusted to between 3.5 to 5.5.

The substrate to be coated with the Iron Blue can be mica of appropriate size and shape for forming nacreous pigments or such mica which has a calcined layer of the metal oxide on its surfaces. Such metal oxides include, for example, titanium dioxide, zirconium dioxide, ferric oxide, and the like. The metal oxide coated mica nacreous pigments are well known in the art and can be prepared, for example, by the procedure set forth in U.S. Pat. Nos. 3,087,828 and 3,087,829, the disclosures of which are hereby incorporated by reference. The ferrocyanide can be any soluble ferrocyanide. The preferred ferrocyanides are the water soluble alkali metal and alkaline earth metal hexacyanoferrates, e.g., $Na_4[Fe(CN)_6]$, $K_4[Fe(CN)_6]$, $[NH_4]_4[Fe(CN)_6]$, as well as the corresponding calcium and strontium salts. The potassium hexacyanoferrate is the preferred ferrocyanide.

Any soluble ferric compound can be used as the source of ferric ions. Thus, ferric chloride, ferric sulfate, and the like can be used. On the basis of availability, ferric chloride is the preferred ferric salt.

The substrate, ferrocyanide, and ferric salt are contacted in an aqueous medium. It is most convenient to separately prepare an aqueous slurry of the substrate, an aqueous solution of the ferrocyanide, and an aqueous solution of the ferric salt which are then appropriately mixed. The concentration of the slurry and solutions are not critical and can be varied as desired. In general, the slurry contains about 5 to 20% substrate, preferably about 15 to 20%, the ferrocyanide concentrate is about 5 25%, preferably about 15 to 20%, and the ferric compound concentration is about 5 to 39%, preferably about 20%.

The formation of the Iron Blue is carried out at elevated temperatures of from about 50° to 100° C, preferably about 80° to 100° C. For maximum adhesion of the Iron Blue to the substrate, reflux temperatures are preferred. Although the ferrocyanide and ferric salt can be added to the substrate slurry simultaneously, it is preferred to first add the ferrocyanide to the substrate slurry and to add the ferric compound to the slurry after reflux begins. The ferric solution can be added all at once or over a period of time and it is preferred to add the ferric solution over a period which can range from about 2 minutes to about 50 minutes. Best results and purer colors are obtained if an addition time of about 3 to 10 minutes is used, and preferably about 5 minutes.

In order to achieve direct adherent precipitation to the substrate, the amount of the ferric ions and the pH have to be regulated. The ferric ion must be present in excess of that required for the stoichiometric reacton with the ferrocyanide. The amount of excess must be from about 30 to 50%. If less than about 30% excess ferric ion is present, colloidal Iron Blue forms but cannot be made to precipitate on the surfaces of the substrate and remains in suspension as colloidal particles. If more than about 50% ferric ions are used, the brown color of the iron oxide simultaneously formed interferes with the blue color of the Iron Blue, and a muddy appearance results. The best results have been obtained using about 35 to 40% excess ferric ions.

The pH is adjusted to within the range of 3.5 to 5.5 and preferably to about 4 to 5. The pH regulation assures that all of the ferric hydroxide is precipitated on the substrate surfaces and further prevents peptization of the colloidal particles when the resulting pigment is washed. More importantly, the pH regulation prevents the removal of the Iron Blue from the surfaces of the substrate by peptization if the platelets are redispersed in an aqueous solution prior to drying. The pH can be regulated by adding a suitable base, such as NaOH, to the reactants with or without a buffer.

Without being limited to theory, it is believed that since the colloidal Iron Blue carries a negative charge and the ferric oxide carries a positive charge, a neutralization of charges results when an excess of the ferric ion is added causing a coagulation of all of the particles. It is entirely possible, however, that an entirely different mechanism is involved.

The amount of the ferrocyanide which is employed relative to the substrate can be varied as desired so long as it does not result in precipitation of the Iron Blue on the substrate in an amount greater than about 10%. If greater quantities of the Iron Blue are precipitated, the Iron Blue being deposited on the surface interferes with the reflection properties of the pigment and much of the nacreous luster is lost. Therefore, a balance must be maintained between the color of the absorption pigment which is desired and the amount of decrease of luster which can be tolerated by the presence of this large quantity of absorption pigment.

The resulting Iron Blue coated substrates are recovered from the aqueous slurry by any convenient means, such as filtration, and washed to remove adsorbed ions. Thereafter, the coated substrate is dried at a temperature sufficiently high to drive off the water, but not high enough to cause decomposition of the Iron Blue. Since Iron Blue begins to decompose at 150° C, a temperature of about 50° to 130° C, preferably about 100° to 120° C, is normally employed. The drying period generally ranges from about 1 to 3 hours.

The drying step not only removes the water which is being held by the Iron Blue pigment, but also causes the Iron Blue to become fixed to the surfaces of the substrate. If insufficiently dried, the Iron Blue pigment can be easily removed from the surfaces by redispersion in water.

As a result of the process of this invention, the Iron Blue is fixed to the surfaces of the substrate so that in most applications the Iron Blue remains with the substrate and migration is avoided. This is especially true in cosmetic applications, such as pressed powders, lipsticks, and the like, where the treatment of the pigment is not harsh. In certain other applications, however, such as in the incorporation into plastics where large shear forces are involved, a separation of the Iron Blue from the substrate can take place since the bonds which hold the pigment on the surface can be broken.

A great advantage of the present invention results from the fact that direct precipitation of an Iron Blue pigment can be made to go directly on the substrate and can be held on the substrate so that large scale processing is possible without loss of color and, in most applications, the Iron Blue pigment will remain with the substrate. When the substrate is mica itself, a very finely divided Iron Blue is formed which can be very easily dispersed and handled, and dusting of the very finely divided Iron Blue is avoided. The substrate can also be calcined interference nacreous pigment in which a layer of titanium dioxide has been coated on a mica substrate and whose reflection color can range from a silver to gold, to red, to blue, to green or any intermediate color. The addition of the absorbing blue pigment modifies the color of the interference pigment and many new and different effects are possible.

A particularly desirable product of this invention is obtained if the Iron Blue is coated on a titanium dioxide coated mica interference pigment which has a green reflection color and which has, in addition, a layer of ferric oxide added to enhance the yellow color. In this case, the mixture of the yellow of the ferric oxide with the blue of the Iron Blue causes the formation of a new green color of exceptional brilliance and luster since the ferric oxide layer can be applied as a smooth coating and the Iron Blue causes only a slight diminution of the reflection from the surfaces. More importantly, however, the green color of this pigment can be varied by changing the ratios of the amount of yellow ferric oxide and Iron Blue which are present to thereby achieve a green ranging from a yellow green to a blue green.

The following Examples are set forth in order to further illustrate the invention. All parts and percentages are by weight and all temperatures are in degrees Centigrade throughout this Specification and Claims unless otherwise indicated.

EXAMPLE 1

45 Grams of a calcined blue reflecting titanium dioxide coated mica containing about 47% $TiO_2$ and 53% mica were dispersed in 200 ml of distilled water in a vessel equipped with a stirrer and a reflux condenser. 10 ml of an 18% w/v solution of $K_4[Fe(CN)_6]\cdot 3H_2O$ in distilled water were added and the resulting slurry was heated to reflux. The ferrocyanide is soluble in the reaction medium and was not observed to deposit on the $TiO_2$ coated mica. At reflux, 5 ml of 1:1 volume:volume 39% aqueous ferric chloride solution:distilled water were added at a rate of 1 ml/minute and when the addition was complete, the slurry was allowed to cool while stirring. When the temperature was about 50° C, the pH of the slurry was adjusted to 4.0 by the addition of 3.5% sodium hydroxide solution in distilled water. The slurry was then filtered on a Buchner funnel and the filter cake was washed with 1 liter of distilled water. The platelets were then placed in an oven at 120° C for 2 hours. The resulting pigment contained about 2.65% Iron Blue and exhibited a blue nacreous luster.

EXAMPLE 2

The procedure of Example 1 was repeated except that a pearl reflecting titanium dioxide coated mica containing about 31% titanium dioxide and 69% mica was used as the substrate. The resulting pigment exhibited a pearl white highlight on a blue background.

EXAMPLE 3

The procedure of Example 1 was repeated except that a gold reflecting titanium dioxide coated mica pigment containing about 36% titanium dioxide and 64% mica was used as the substrate. The resulting pigment exhibited a gold highlight on a blue background.

EXAMPLE 4

The procedure of Example 1 was repeated except that a red reflecting titanium dioxide coated mica nacreous pigment containing about 44% $TiO_2$ and 54% mica was used as the substrate. The resulting pigment exhibited a red highlight on a blue background.

EXAMPLE 5

The procedure of Example 1 was repeated except that a green reflecting titanium dioxide coated mica pigment containing about 54% $TiO_2$ and 47% mica was used as the substrate. The resulting pigment exhibited a green highlight on a blue background.

EXAMPLE 6

The procedure of Example 1 was repeated except that uncoated mica having a surface area of 3.5 square meters per gram as determined by the BET method and having most particles between 5 and 50 microns in the longest dimension was used as the substrate. A pigment exhibiting a blue color was obtained.

EXAMPLE 7

A pigment product taken as a substrate contained 44.5% mica, 50.1% $TiO_2$ and 5.4% ferric oxide. The product had been calcined and it showed a green color by specular reflection.

950 Grams of this pigment were dispersed in 3800 ml of distilled water in a vessel equipped with a stirrer and a reflux condenser. 156 ml of an 18% w/v solution of $K_4[Fe(CN)_6]\cdot 3H_2O$ in distilled water were added and the resulting slurry was heated to reflux. At reflux, 78 ml of a 1:1 volume: volume 39% aqueous ferric chloride solution: distilled water were added at the rate of 15 ml/minute. When the addition was complete, the slurry was allowed to cool while stirring and at about 50° C, the pH was adjusted to 4.0 by the addition of 3.5% sodium hydroxide in distilled water. The slurry was filtered on a Buchner funnel and the filter cake washed with 19 liters of distilled water. The resulting pigment was then dried at 100° C for 2 hours and displayed an intense green color.

It has been found that an excellent green color can be obtained when the weight ratio of ferric oxide to the Iron Blue is about 2.7:1. Pigments which are bluer can be made by decreasing this ratio and pigments which exhibit more of a yellow color can be made by increasing this ratio.

EXAMPLE 8

45 Grams of a calcined blue reflecting titanium dioxide coated mica were dispersed in 200 ml of distilled water in a reaction vessel equipped with a stirrer and a reflux condenser. The resulting slurry was heated to reflux with stirring and at reflux, $Na_4[Fe(CN)_6]$ and ferric sulfate solutions were simultaneously added. 10 ml of an 18 w/v solution of sodium hexacyanoferrate were added at a rate of 2 ml/minute, and 5 ml of a 19.5% aqueous ferric sulfate solution was added at a rate of 1 ml/minute. When addition was complete, heat was removed and when the slurry had cooled to about 75° C, the pH was adjusted to 4.5 by the addition of a 4% aqueous caustic solution. At room temperature, the slurry was filtered and the filter cake washed with distilled water. The resulting platelets were then dried at 110° C for 2.5 hours to obtain a blue nacreous pigment.

Various changes and modifications can be made in the process and products of this invention without departing from the spirit and scope thereof. The various embodiments set forth herein were for the purpose of further illustrating the invention but were not intended to limit it.

We claim:

1. A method for directly adhering Iron Blue to a mica or metal oxide coated mica substrate which comprises mixing said substrate with a soluble ferrocyanide and a soluble ferric compound in an aqueous medium such that there is at least 30% excess ferric ions based on the amount of ferric ion necessary to form Iron Blue, adjusting the pH to 3.5 to 5.5, recovering the resulting Iron Blue coated substrate and drying the recovered Iron Blue coated substrate at a temperature below the decomposition temperature of the Iron Blue.

2. The method of claim 1 wherein the amount of excess ferric ions is 30 to 50%.

3. The method of claim 1 wherein said drying is effected at a temperature of 50 to 130° C.

4. The method of claim 1 wherein said pH is adjusted to about 4 to 5.

5. The method of claim 1 wherein said excess ferric ions is 30 to 50%, said pH is adjusted to about 4 to 5, and said drying is effected at a temperature of about 50° to 130° C.

6. The method of claim 5 wherein said ferrocyanide is potassium hexacyanoferrate and said ferric compound is ferric chloride.

7. The method of claim 1 wherein said substrate is a titanium dioxide coated nacreous pigment.

8. The method of claim 7 wherein said titanium dioxide coated mica nacreous pigment has a top coat of ferric oxide.

9. The method of claim 8 wherein the amount of soluble ferrocyanide employed is such that the weight ratio of ferric oxide top coat to Iron Blue deposited thereon is about 2.7:1, whereby a pigment with a green adsorption color is obtained.

10. The method of claim 1 wherein said ferrocyanide is potassium hexacyanoferrate and said ferric compound is ferric chloride.

* * * * *